United States Patent [19]

Earl

[11] 4,019,698
[45] Apr. 26, 1977

[54] AIR CUSHION UNDERCARRIAGE BRAKE SYSTEM

[75] Inventor: T. Desmond Earl, Buffalo, N.Y.
[73] Assignee: Textron, Inc., Providence, R.I.
[22] Filed: Mar. 25, 1976
[21] Appl. No.: 670,258
[52] U.S. Cl. .................. 244/110 A; 180/119; 180/124; 180/127; 188/5; 244/100 A
[51] Int. Cl.² .................. B60V 3/08; B64C 25/32
[58] Field of Search ....... 244/100 R, 100 A, 102 R, 244/110 H, 110 R, 110 A; 188/5, 250 R, 250 H, 250 B; 180/124, 119, 127, 128, 115

[56] References Cited
UNITED STATES PATENTS

| 3,219,135 | 11/1965 | Bunting et al. | 180/127 |
| 3,524,517 | 8/1970 | La Fleur | 180/119 |
| 3,595,336 | 7/1971 | Perez | 180/124 |
| 3,730,300 | 5/1973 | Scherenberg | 180/115 |

Primary Examiner—Duane A. Reger
Assistant Examiner—Galen L. Barefoot
Attorney, Agent, or Firm—Bean, Kauffman & Bean

[57] ABSTRACT

An improved ground-run/skid-braking and/or maneuvering control system for an aircraft or ground effect machine having an air cushion type undercarriage of the type comprising an elastically retractable inflatable trunk or other air inflatable air cushion confining device fabricated of elastic sheet material. The braking-/control system comprises a mechanically actuated multiple spine system disposed interiorly of the trunk fabric; and is operable under pilot control to cause portions of the trunk to curvilinearly project downwardly below the basic footprint level of the trunk when inflated, to provide the desired ground-friction braking/maneuvering effects. The projected portions of the trunk are externally armored by means of wear/tear resistant friction pads which are relatively pleat-folding automatically incidental to elastic contractions of the trunk sheet material, to minimize craft flight drag effects.

11 Claims, 15 Drawing Figures

INFLIGHT MODE
TRUNK RETRACTED
BRAKE PADS PLEAT-FOLDED

IN AIR CUSHION SUPPORTED MODE
(LANDING APPROACH, TAKE OFF, HOVERING)
TRUNK INFLATED-BRAKE PADS INOPERATIVE

IN GROUND RUN, BRAKING/
MANEOVERING MODE
TRUNK INFLATED
BRAKE PADS DEPLOYED

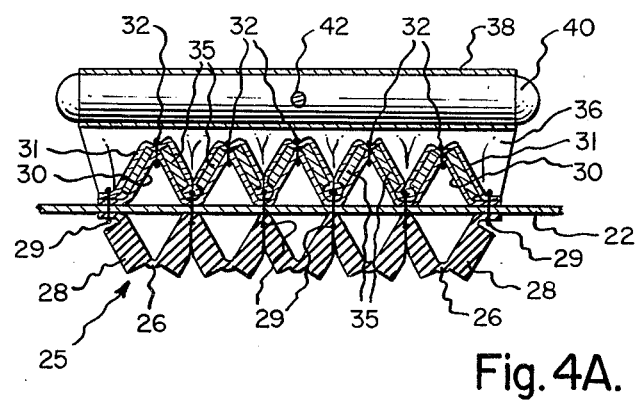
Fig. 4A.

Fig. 5A.
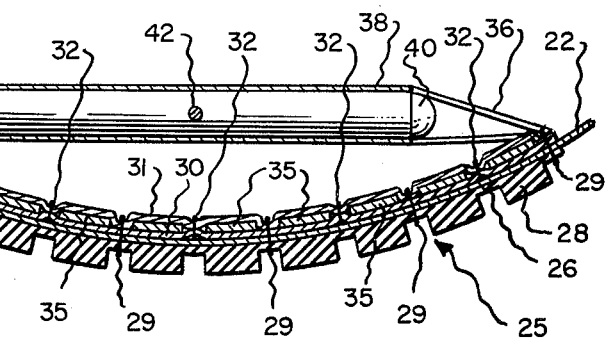

Fig. 6A.
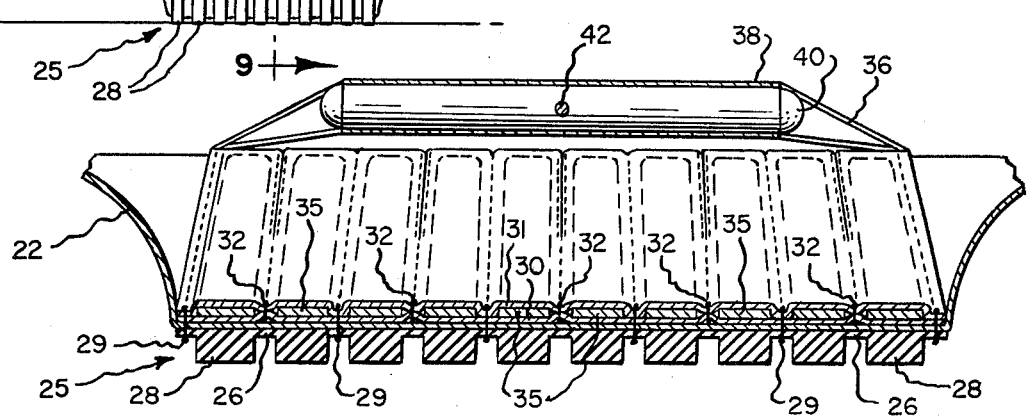

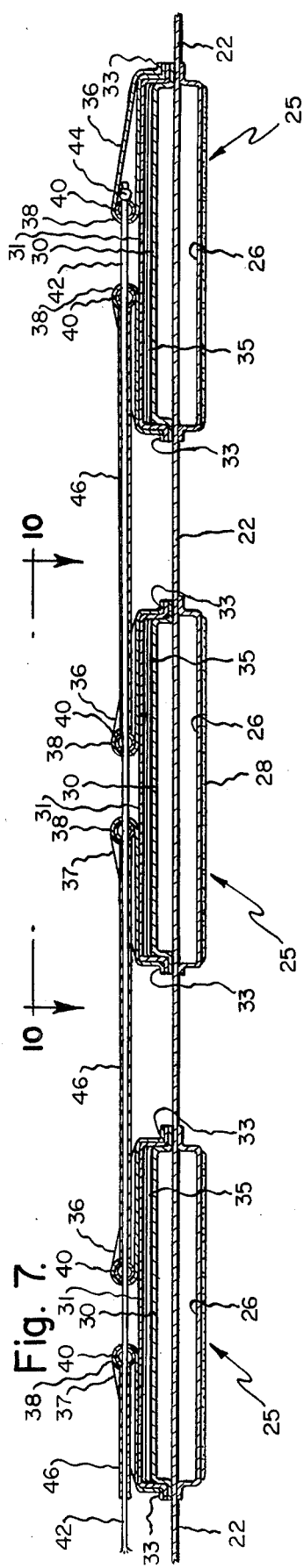
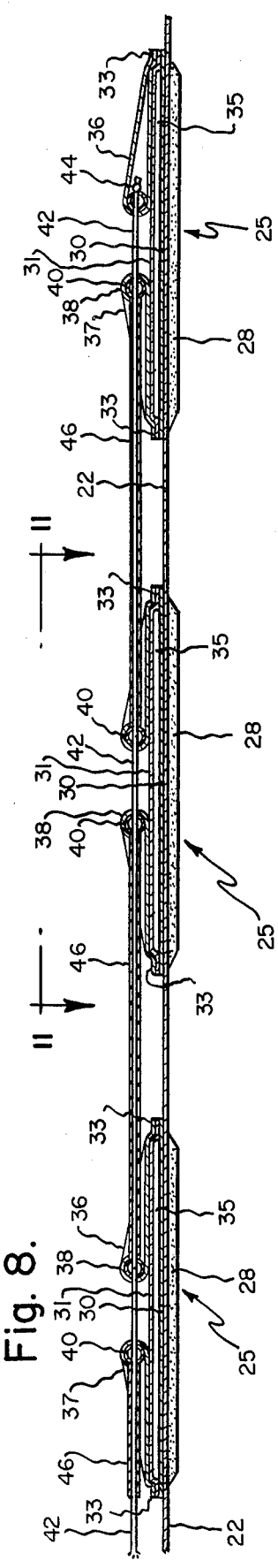
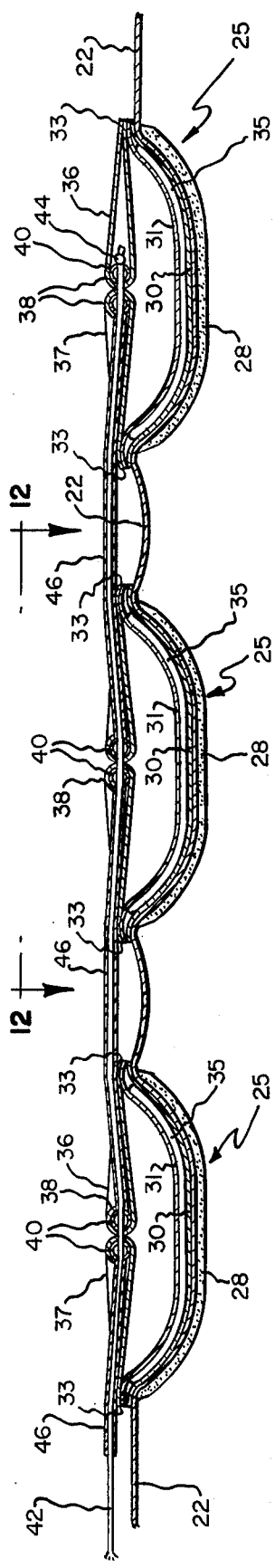
Fig. 7.
Fig. 8.
Fig. 9.

AIR CUSHION UNDERCARRIAGE BRAKE SYSTEM

BACKGROUND OF THE INVENTION

The invention relates to inflated trunk or cell type arrangements in air cushion supported vehicles; such as shown for example in U.S. Pat. No. 3,275,270, U.S. Pat. No. Reis. 26,812 and U.S. Pat. No. 3,524,517; the invention comprising improved means for causing, under pilot control, a plurality of pad-shaped friction brake means located along the footprint area of the trunk system to project downwardly from the main trunk structure so as to elevate portions of it relative to the reaction surface, thereby increasing the effective cushion air escape gap and in consequence reducing the air cushion lift effects. At the same time the pads contacting the reaction surface provide frictional drag-braking effects against ground-run/skid travel motions of the craft. The invention contemplates that the pads at opposite sides of the vehicle may be differentially controlled by the vehicle operator to provide an improved ground-run vehicle guidance technique. By way of example the invention is illustrated herein by the accompanying drawing, wherein:

IN THE DRAWING

Figure 1:
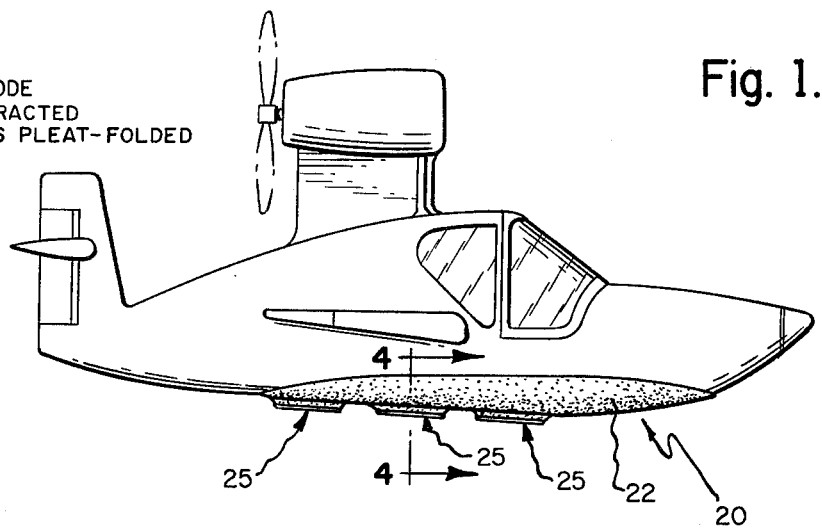
FIG. 1 is a side elevational view of an airplane embodying the invention in flight mode; the air cushion type undercarriage thereof and its associated braking system both being retracted and in an inoperable condition.
Figure 2:
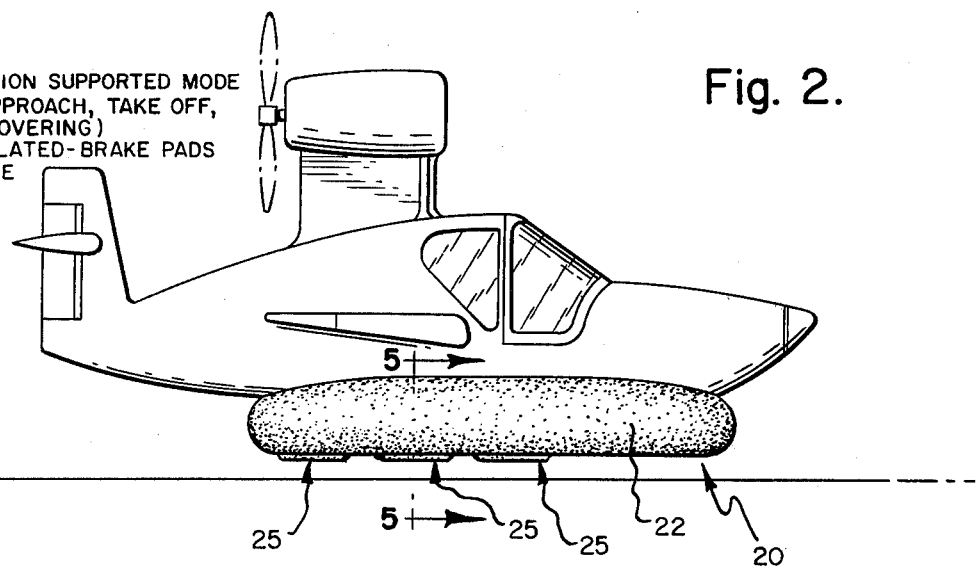
FIG. 2 is a view corresponding to FIG. 1 but showing the undercarriage trunk in its inflated condition while the braking system is inoperative.
Figure 3:
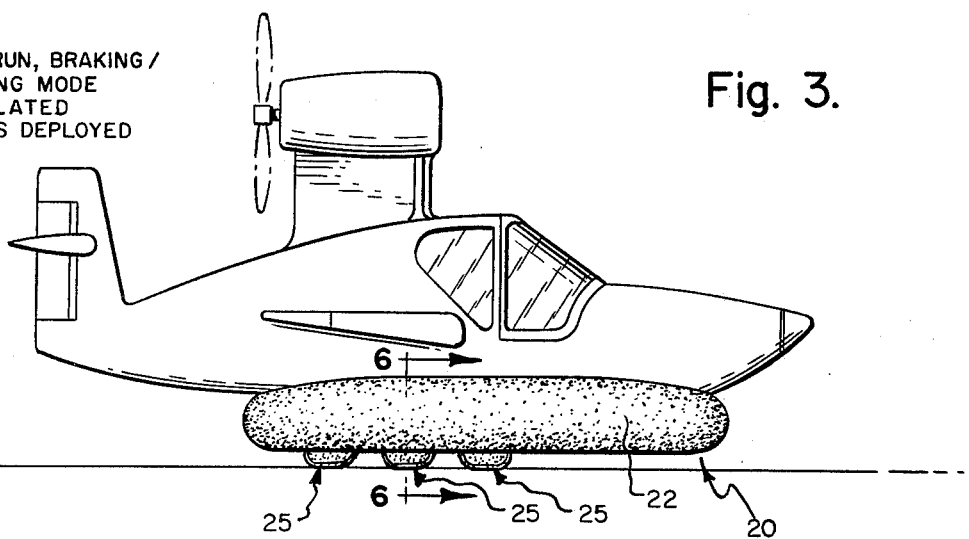
Figure 4:
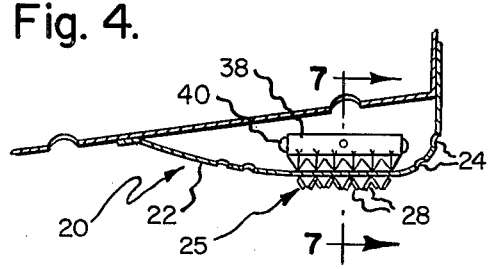
Figure 5:
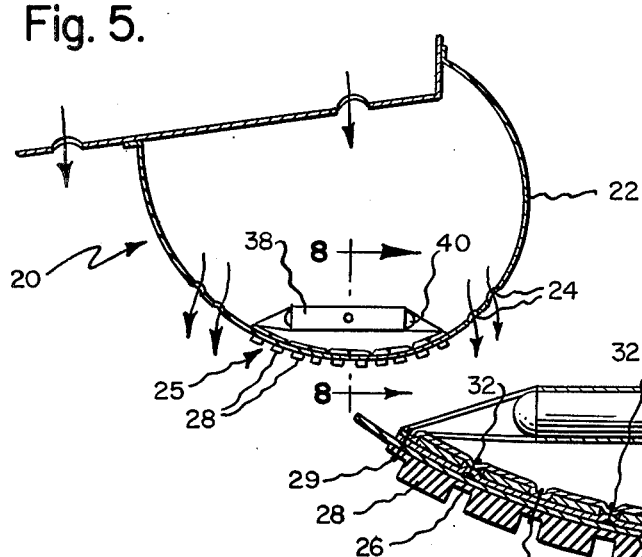
Figure 6:
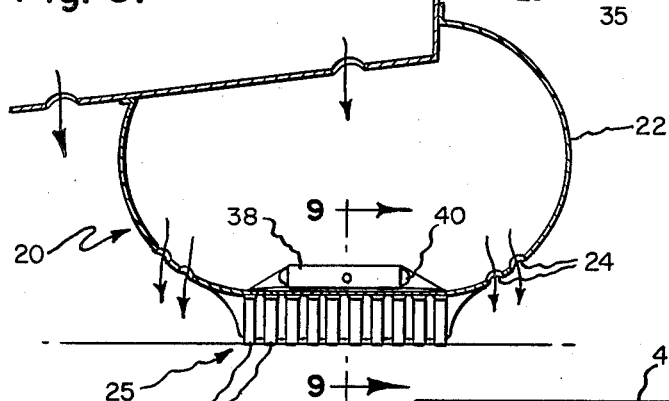
Figure 10:
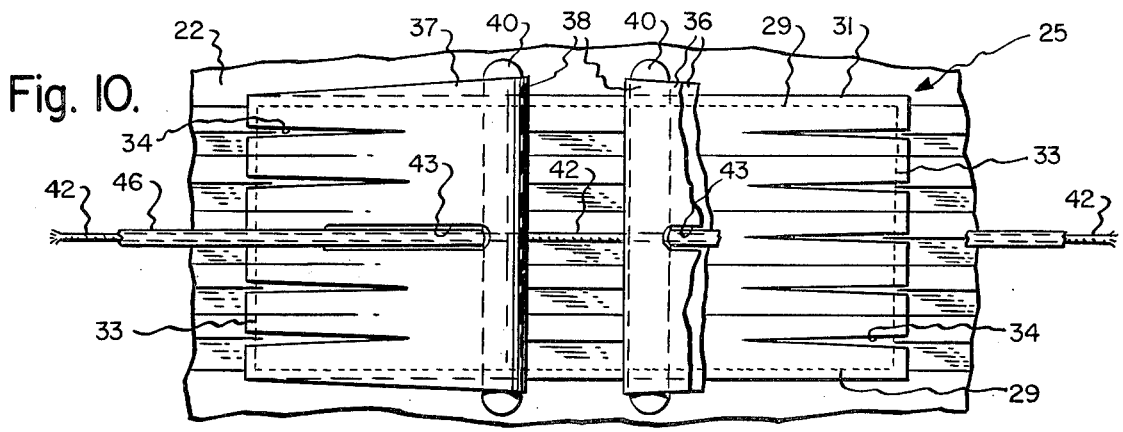
Figure 11:
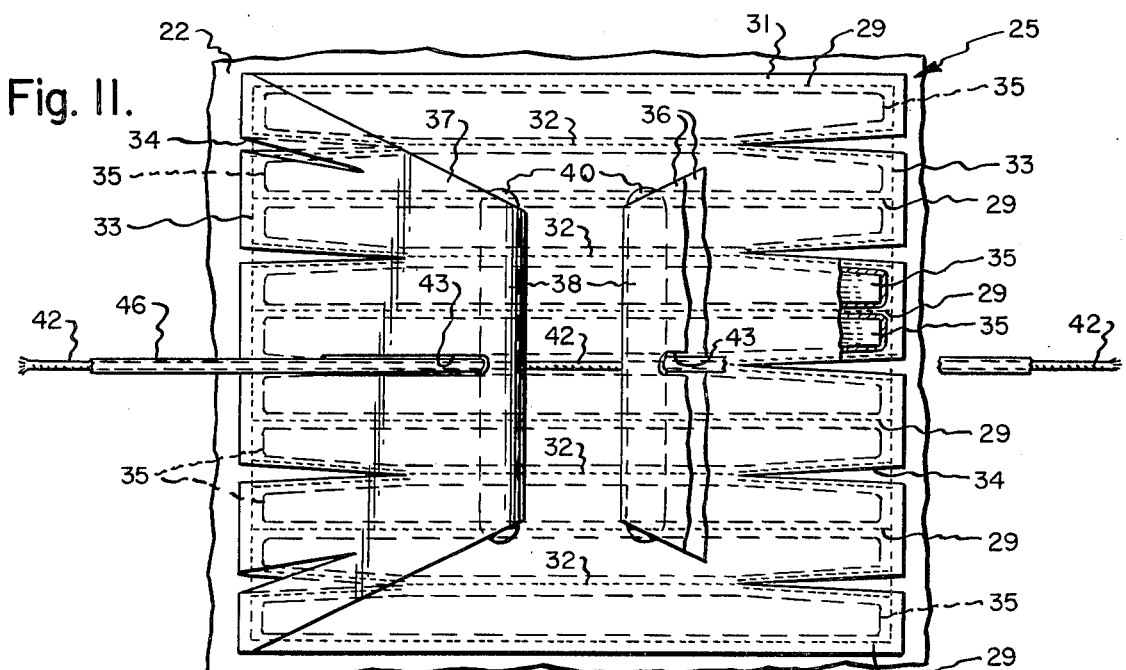
Figure 12:
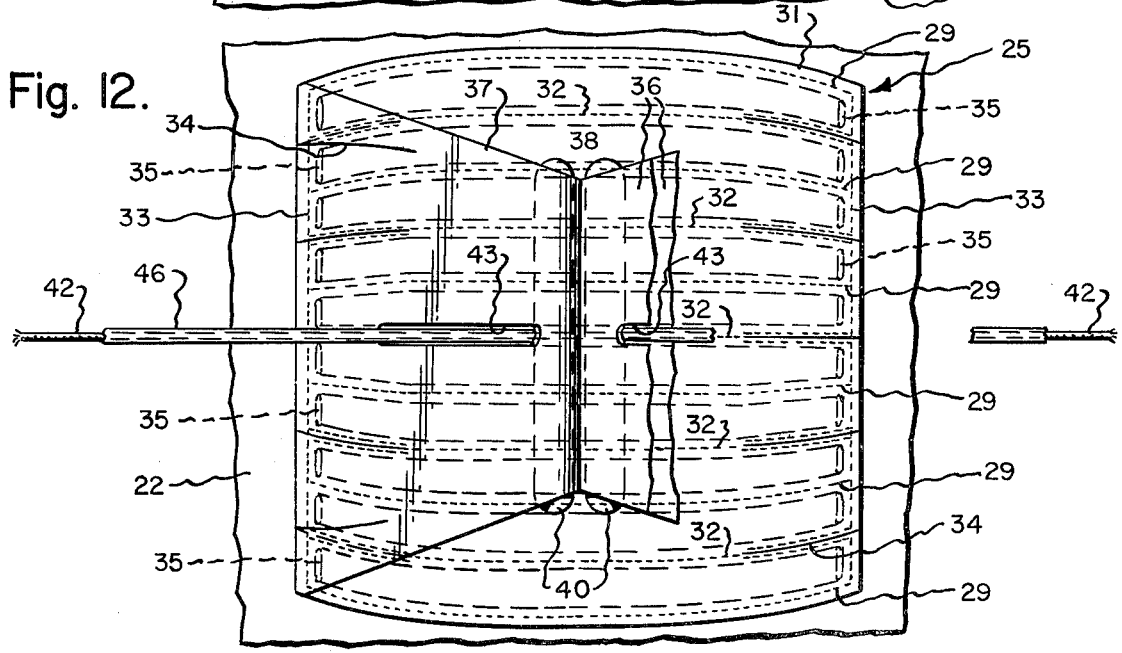

FIG. 3 corresponds to FIGS. 1-2 but illustrates the aircraft in air cushion supported mode relative to a reaction surface, the braking system being extended and in an operative condition;

FIG. 4 is a fragmentary sectional view taken as suggested by line 4—4 of FIG. 1;

FIG. 4A is an enlarged scale fragmentary view of a portion of FIG. 4;

FIG. 5 is a fragmentary enlarged scale sectional view taken as suggested by line 5—5 of FIG. 2;

FIG. 5A is a fragmentary enlarged scale view of a portion of FIG. 5;

FIG. 6 is a fragmentary enlarged scale view taken as suggested by line 6—6 of FIG. 3;

FIG. 6A is a fragmentary enlarged scale of a portion of FIG. 6;

FIGS. 7, 8, 9, are fragmentary sectional views taken as suggested by lines 7—7, 8—8, and 9—9 of FIGS. 4, 5, 6, respectively; and FIGS. 10, 11, 12, are fragmentary plan views taken as suggested by lines 10—10, 11—11, and 12—12 of FIGS. 7, 8, 9, respectively.

DETAILED DESCRIPTION

As illustrated by way of example in the drawing herewith, the invention may be employed in conjunction with the undercarriage structure of an airplane; but it is to be understood that the invention may also be employed in conjunction with machines of the so-called "air cushion vehicle" or "ground effect" or "surface effect" types. In either case, it is contemplated that the invention is to be incorporated in an air-inflatable trunk system such as is illustrated generally at 20, and which functions as a flexible barrier depending from the hull structure of the machine to define thereunder an air cushion confining space such as may be supplied with compressed air or other gas, as is well known in the art. The trunk system may be of various forms, but as shown herein it is of oblate toroidal plan form, and is constructed of suitably two-way elastic sheet material 22; thereby providing an inflatable trunk for circumscribing at least some part of the air cushion space beneath the machine. As is also well known, bleed-off apertures such as are shown at 24 through the trunk fabric may be provided along the footprint areas thereof to "lubricate" take-off/landing/taxiing operations of the vehicle.

As in the case of U.S. Pat. No. 3,524,517, the present invention contemplates that the footprint areas of the inflatable trunk device are provided at intervals therealong with extendible friction-pad means such as are shown herein by way of example generally at 25; and, as illustrated herein by way of example, they are externally affixed to the basic trunk sheet structure 22 and are of tear and wear-resistant material. Thus, pads 25, when extended in response to vehicle-operator actuation of the associated control device are adapted to drag on a reactive ground surface during land/taxiing ground maneuvers to provide the desired machine directional control. During a landing/ground-run maneuver the air cushion lift effect reduction resulting from the momentary uplift of portions of the main portion of the trunk footprint areas incidental to extension of the brake pads contribute to the "hold-down" and control facility. This is due to increase of the size of the cushion air escape gap under the major portion of the trunk system.

For example, if the vehicle operator actuates (as by means of a foot/toe control pedal) the pad control system so as to cause all of the pads 25 to simultaneously project downwardly, adjacent portions of the trunk will be thereby elevated so as to enlarge the effective cushion air escape gap, with consequent reduction of the vehicle lift effect. This result in an immediate braking of the vehicle's forward motion. However, unequal projections of the pads 25 at opposite sides of the maneuvering control axis of the vehicle will assist and/or enable the operator to perform desired directional maneuvering control of the vehicle, such as incidental to landing, taxiing, docking and/or take-off procedures.

Whereas commonly assigned U.S. Pat. No. 3,524,517 discloses a system designed to provide the aforesaid type braking/maneuvering control facilities, that system requires a source of higher pressure air; the provision of which may involve an extensive subsystem. Also, in the case of the above mentioned patented system, the dynamics of the pneumatic operating system thereof in response to pilot controls are undesirably slow, and therefore do not provide the pilot with optimum control of the vehicle.

The present invention is addressed to and overcomes the aforesaid problems; and employs rapid-response mechanical means for deployment of brake pad devices at separate portions of the footprint area of the trunk downwardly below the elevation of the major "footprint" portion of the trunk. By way of example, in the drawing herewith these separate brake pad units 25 are provided longitudinally along the footprint areas of the trunk system at opposite sides thereof; but it is to be understood that any number and/or arrangements thereof may be provided, as may be required.

Furthermore, each pad unit 25 comprises a plurality of shoes which are interconnected by a flexible "hinge" base 26 so as to be laterally pleat-foldable to freely accommodate the girthwise shrinkage of the trunk when undergoing deflation, as will be more fully explained hereinafter. More specifically, as best shown herein at FIGS. 5A–6A, each unit 25 may be formed of an elastomeric friction wear/tear resistant material to include a relatively thin and flexible base portion 26 integrally molded with downwardly extending, spaced apart, parallel rib-shaped brake shoe portion 28. As best shown at FIGS. 4A, 5A, 6A, each pad 25 is fixed to the trunk sheet 22 by suitable means such as adhesive, stitching, stapling or the like as illustrated at 29, in such manner that the friction shoe portions 28 run fore/aft, longitudinally of the vehicle.

Interiorly of the trunk sheet 22 and congruently of each unit 25 is provided a flexible envelope comprising a bottom sheet 30 and a cover sheet 31 which are parallel stitched together as shown at 32 and to the trunk sheet as by the same stitching (or other connectors) as shown at 29. Along the front and rear ends of each pad unit the envelope 30–31 is fastened to the trunk sheet 20 as indicated at 33. Within the pockets thus formed between the envelope 30–31 and the trunk sheet 22 are provided pairs of parallel disposed spring stays or spines 35. The opposite ends 36, 37 of each envelope 30–31 are reverse-folded to overlie the spine system and at their terminals are flap-folded and stitched so as to provide cylindrical sleeves 38—38 within which are slide-fitted control tubes (or rods) 40—40. The parts are so dimensioned and arranged that when the trunk 20 is deflated with the trunk sheet material is in its "relaxed" condition, the control rods 40—40 of each unit are in spaced apart parallel relationship as shown at FIGS. 7, 8, 10, 11 and are spaced from adjacent control rods 40 of adjacent units by substantially incompressible control cable sheaths 46.

A pilot control cable for the brake system is provided as shown at 42 passing slidably through sheaths 46, and as best shown in FIGS. 7–9 is dead ended at 44 against the rearmost control rod 40 of the multiple brake pad system. The control cable 42 passes centrally through the rearmost control rod 40, and thence slidingly through the next in line control rod 40 and sheath 46; and so on throughout the control rod sheath system; emerging at the front end of the system for connection to the output member of a hydraulic jack or the like. The flaps 36–37 are apertured as shown at 43 (FIGS. 10–12) to accommodate passage of the cable and sheaths 46 therethrough. Operation of the jack is under control of the vehicle pilot by means of any suitable rapid response interconnecting mechanical/electrical, or like system. The cable 42 is carried externally of the system within a sheath 46.

Thus, it will be understood that starting from a trunk only inflated condition, as shown for example at FIGS. 2, 5, 8, 11, upon pilot actuation of the control with a view to deploying the brake pads, the cable 42 will pull upon the rearmost rod 40 so as to draw it toward the next in line rod 40. This causes the rearmost rod 40 to pull upon the associated sleeve 38 to shorten the horizontal distance between the opposite ends of them or spines 35 since the next in line control rod 40 is held in its position by substantially incompressible sheath 46; thus forcing them to bow upwardly at their opposite ends and downwardly intermediately thereof. Incidental thereto, the associated portion of the trunk sheet 22 is projected downwardly and carries therewith the associated brake unit 25. As shown herein, the outer ends of the stays or spines 35 are (by pairs) enclosed in separated portions of the containing envelope. Note that the front and rear extremities of the envelope 30–31 are gored as shown at 34 (FIGS. 10, 11, 12). Thus the outer ends of the paired spines are permitted to bow in different planes relative to the intermedial portions thereof, to accommodate the trunk curvature and to reduce operating loads, as best shown in FIG. 5A.

As the control cable pulls further forwardly this same action is repeated progressively or simultaneously within the more forwardly located brake units; and incidental therewith the associated brake units 25 are also caused to be pulled up at both ends into somewhat sleigh-runner forms while the intermediate brake shoe portions 28 thereof are caused to project downwardly below the general level of the footprint area of the trunk for braking and/or maneuvering purposes, as illustrated at FIGS. 3, 6, 9, and 12. Upon completion of the braking/maneuvering run the vehicle pilot will typically cancel the brake deployment signal, whereupon the cable 42 is relaxed and permits the spring stays 45 to flatten whereupon the resilient trunk sheet material will reassume its normal condition as illustrated at FIGS. 2, 5, 8 and 11.

It is to be particularly noted that incidental to deflation of the trunk from the condition shown at FIG. 2 to its aerodynamically compact condition as shown at FIG. 1, the brake unit systems readily adapt and pleatfold contract in conformance with the girthwise shrinkage of the trunk sheet 22. This is because the spring spines 35 and their enclosing sleeves 30 are free to assume their pleat-folded condition as shown in FIGS. 4, 4A, while the paired brake shoe portions 28 also hinge toward one another in pleat-folded paired unit relation by reason of the flexibility of the elastomeric webbing 26 therebetween.

I claim:
1. In an aircraft, in combination;
   an aircraft body having a bottom surface;
   a flexible inflatable bag-like trunk formed of elastic sheet material circumscribing at least a portion of said bottom surface to define an air cushion space therebelow;
   means for maintaining the interior of said trunk under superatmospheric air pressure to balloon it downwardly below said bottom surface of the body, said trunk when inflated having a footprint area;
   means for supplying said air cushion space with air at a rate sufficient to elevate said aircraft from a reaction surface;
   said trunk including brake means on said footprint area thereof for engaging the reaction surface;
   said brake means comprising at least one brake unit including an elastomeric base plate portion affixed to the sheet material of said trunk externally thereof and having paired longitudinally parallel running friction brake shoes extending therefrom; and
   actuation means under aircraft operator control for causing said brake unit and its associated portion of the trunk sheet to be elastically projected below the normal footprint area profile of said trunk de- vice with said friction brake shoes deployed in unison for contact with a reaction surface;

whereby upon deactivation of said actuation means said elastically projected portions of said trunk sheet return to normal trunk inflation condition, and whereby upon deflation of said trunk said brake shoes assume paired pleat-folded relationships to accommodate elastic contractions of associated portions of said trunk sheet.

2. In an aircraft as set forth in claim 1, wherein said actuation means includes a pair of normally flat resilient spine devices disposed interiorly of said trunk in superposed relation to a pair of said brake shoes, and mechanical means under aircraft operator control for biasing said spine devices into downwardly bowed configuration to cause said brake shoes to project downwardly below the normal footprint profile of said trunk.

3. In an aircraft as set forth in claim 2, wherein said spine devices are enclosed within envelope means attached to said trunk; and wherein said envelope means includes fore and aft extensions thereof reverse-folded over the respective ends of said spine devices and terminating in connections to pull means operable by said mechanical means.

4. In an aircraft as set forth in claim 3, wherein said elastomeric base plate portion has a plurality of parallel pairs of brake shoes extending therefrom, and wherein said actuation means includes a plurality of pairs of spine devices in superposed relation to said brake shoes.

5. In an aircraft as set forth in claim 3, wherein said brake means comprises a plurality of brake units disposed in spaced relation within the footprint area of said trunk.

6. In an aircraft, in combination;
an aircraft body having an air cushion space therebelow;
an inflatable trunk formed of elastic sheet material providing at least a portion of the seal for said air cushion space;
said trunk including brake means on the lower surface portion thereof for engaging a reaction surface;
said brake means including an elastomeric base plate portion affixed to the sheet material of said trunk externally thereof and having longitudinally parallel friction brake shoes extending therefrom, and
actuation means under aircraft pilot control for causing said brake means and its associated portion of the trunk sheet material to be projected beyond the normal footprint area profile of said trunk with said friction brake shoes deployed for contact with a reaction surface;
whereby upon deactivation of said control means said projected portions of said trunk elastically return to normal trunk inflation condition, and whereby upon deflation of said trunk said brake shoes assume pleat-folded relationships in accommodation of elastic contractions of associated portions of said trunk.

7. In an aircraft as set forth in claim 6, wherein said actuation means includes a pair of normally flat resilient spine devices disposed interiorly of said trunk in superposed relation to a pair of said brake shoes, and mechanical means under aircraft operator control for biasing said spine devices into downwardly bowed configuration to cause said brake shoes to project downwardly below the normal footprint profile of said trunk.

8. In an aircraft as set forth in claim 7, wherein said mechanical means includes an envelope shaped device having fore and aft extensions thereof reverse-folded over the respective ends of said spine devices and terminating in connections to pull means operable by said mechanical means.

9. In an aircraft as set forth in claim 8, wherein said elastomeric base plate portion has a plurality of parallel pairs of brake shoes extending therefrom.

10. In an aircraft as set forth in claim 9, wherein said brake means comprises a plurality of brake units disposed in spaced relation within the footprint area of said trunk.

11. In an air cushion supported vehicle having an air cushion type undercarriage, in combination;
a vehicle body;
a flexible inflatable trunk formed of elastic sheet material depending from said body and defining at least a portion of an air cushion space therebelow;
means for maintaining the interior of said trunk under superatmospheric air pressure to balloon it downwardly below said body, said trunk when inflated having a footprint area;
means for supplying said air cushion space with air at a rate sufficient to elevate said vehicle from a reaction surface;
said trunk including brake means on said footprint area thereof for engaging the reaction surface and raising at least portions of said footprint area of the trunk to increase the cushion air escape gap between said footprint area and the reaction surface, thereby decreasing the vehicle lift effect;
said brake means comprising at least one brake unit including an elastomeric base plate portion affixed to the sheet material of said trunk externally thereof and having at least one longitudinally parallel running pair of friction brake shoes extending therefrom; and
actuation means under vehicle operator control for causing said brake unit and its associated portion of the trunk sheet to be elastically projected below the normal footprint area profile of said trunk with said friction brake shoes deployed is unison for contact with a reaction surface;
whereby upon deactivation of said actuation means said elastically projected portions of said trunk sheet return to normal trunk inflated condition, and whereby upon deflation of said trunk said brake shoes assume paired pleat-folded relationship to accommodate elastic contractions of associated portions of said trunk sheet.

* * * * *

UNITED STATES PATENT AND TRADEMARK OFFICE
CERTIFICATE OF CORRECTION

PATENT NO. : 4,019,698
DATED : April 26, 1977
INVENTOR(S) : T. Desmond Earl

It is certified that error appears in the above-identified patent and that said Letters Patent are hereby corrected as shown below:

Col. 1, Line 51 - After "scale", please insert --- view ---.

Col. 2, Line 42 - "result" should be --- results ---.

Col. 3, Line 1 - After "any", please insert --- other ---.

Col. 3, Line 4 - After "shoes", please insert --- 28 ---.

Col. 3, Line 65 - After "ends of" please delete "them" and insert --- the spring stays ---.

Col. 3, Line 68 - Please delete "them" and insert --- the spring stays ---.

Col. 6, Line 51 - "is" should be --- in ---.

Signed and Sealed this sixteenth Day of August 1977

[SEAL]

Attest:

RUTH C. MASON
Attesting Officer

C. MARSHALL DANN
Commissioner of Patents and Trademarks